United States Patent
Houser et al.

(10) Patent No.: US 11,552,386 B1
(45) Date of Patent: Jan. 10, 2023

(54) DISTRIBUTED DIRECTIONAL APERTURE SYSTEM FOR ROTOR WING

(71) Applicant: NORTHROP GRUMMAN SYSTEMS CORPORATION, Falls Church, VA (US)

(72) Inventors: Peter B. Houser, Poway, CA (US); Andrew S. Cardes, Bonita, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 0 days.

(21) Appl. No.: 17/458,085

(22) Filed: Aug. 26, 2021

(51) Int. Cl.
*H01Q 1/28* (2006.01)
*B64C 27/473* (2006.01)
*H01Q 3/34* (2006.01)
*H04B 7/0426* (2017.01)

(52) U.S. Cl.
CPC ........... *H01Q 1/283* (2013.01); *B64C 27/473* (2013.01); *H01Q 3/34* (2013.01); *H04B 7/043* (2013.01); *B64C 2027/4736* (2013.01)

(58) Field of Classification Search
CPC . H01Q 1/28; H01Q 1/283; H01Q 3/34; B64C 27/473; B64C 2027/4736
See application file for complete search history.

(56) References Cited

U.S. PATENT DOCUMENTS

| | | | | |
|---|---|---|---|---|
| 3,389,393 | A * | 6/1968 | Young, Jr. | .......... H01Q 21/0043 343/708 |
| 3,528,070 | A * | 9/1970 | Young, Jr. | ................ A63H 3/36 342/158 |
| 4,737,788 | A | 4/1988 | Kennedy | |
| 6,940,186 | B2 | 9/2005 | Weitkamp | |
| 9,832,545 | B2 | 11/2017 | Houser et al. | |
| 10,644,385 | B1 * | 5/2020 | Greenwood | .......... H01Q 21/20 |
| 10,652,634 | B2 | 5/2020 | Houser et al. | |

FOREIGN PATENT DOCUMENTS

| | | | | |
|---|---|---|---|---|
| JP | | 218723 A * | 8/1993 | ............... H01Q 3/34 |
| WO | WO-2016148496 A1 * | | 9/2016 | ............... H01Q 1/08 |

* cited by examiner

*Primary Examiner* — Hoang V Nguyen
(74) *Attorney, Agent, or Firm* — Katten Muchin Rosenman LLP (57) ABSTRACT

The disclosed invention provides a distributed directional aperture (DDA) system that is installed in a vertical lift aircraft that comprises a fuselage and a rotor system including rotary wings rotatably coupled to the fuselage. The DDA system provides capability to receive and/or transmit signals in one or more frequency bands, and provides communications, signals intelligence (SIGNINT), positional sensing, jamming, and offensive cyber on the vertical lift aircraft. The DDA system of the vertical lift aircraft includes a sensor and emitter array subsystem that includes a plurality of sensors and emitters distributed in the rotary wings, a beamformer subsystem that processes the sensor signals and emitter signals, and a telemetry subsystem that conveys signals between the sensor and emitter array subsystem and the beamformer subsystem.

22 Claims, 11 Drawing Sheets

DISTRIBUTED DIRECTIONAL APERTURE SYSTEM FOR ROTOR WING

BACKGROUND

Apertures are commonly known to be used to receive and transmit energy for various purposes, including cooperative communications, uncooperative signal intercept, uncooperative signal interference, and positional sensing. Apertures encompass systems that consist of a single sensing or emission element and provide substantially omnidirectional performance. Apertures also encompass systems that consist of many elements and are collectively used to transmit or receive energy in a restricted direction, thereby increasing the quality of the reception or transmission. The techniques for restricting energy sensing or emission to a limited direction are commonly known as beamforming. Directional apertures have been an implementation challenge at higher frequencies due to processing and data transfer speed limitations.

Most commonly-used apertures consist of a single antenna that receives and transmits signals omnidirectionally. Each such aperture is dedicated to a single, unalterable purpose, is connected to a specific electronic system, and is sensitive to a limited range of signal characteristics. As a result of these "stovepipes", many entities are burdened with an excess number of apertures. The excess number of apertures, and the corresponding stovepiped telemetry, has a negative effect on the platform's structure, aerodynamics, and radar observability. In addition, the omnidirectional aperture reception characteristics limit received signal quality, while the omnidirectional transmission characteristics may provide an opportunity for interception by an adversary.

For these reasons, vertical lift aircraft, such as helicopters, are particularly challenged for aperture placement due to the fuselage shape. It is difficult to look up through the moving rotor blades and there are no fixed wings which are convenient aperture mounting points for fixed wing aircraft.

SUMMARY

In order to overcome the disadvantages and issues of the conventional aperture systems for vertical lift aircraft, the disclosed invention provides a distributed directional aperture (DDA) system that is configured to be installed in vertical lift aircraft.

These advantages may be achieved by a distributed directional aperture (DDA) system installed in a vertical lift aircraft that comprises a fuselage and a rotor system including rotary wings rotatably coupled to the fuselage. The DDA system receives and transmits signals in one or more frequency bands. The DDA system includes a sensor and emitter array subsystem that includes a plurality of array elements located in the rotary wings, a beamformer subsystem that processes the sensor signals and emitter signals, and a telemetry subsystem that conveys the sensor signals from the sensor and emitter array subsystem to the beamformer subsystem and conveys the emitter signals from the beamformer subsystem to the sensor and emitter array subsystem. The array elements include sensors to sense energy in a media adjacent the rotary wings and to generate sensor signals. The array elements include emitters to emit emitter signals based on processing of the sensor signals by the system. The telemetry subsystem includes at least one joint device that transmits the sensor signals and the emitter signals between the rotor system and the fuselage.

In one embodiment, the beamformer synthesizes directional reception channels and process transmission channels to synthesize telemetry data that is emitted by the emitters. The beamformer subsystem is configured to determine relative positions of the plurality of sensors and emitters based on navigation data pertaining to the vertical lift aircraft, to determine at least one time delay corresponding to each of the plurality of sensors and emitters based on the relative positions, and to apply the respective time delays to the corresponding sensor signals to generate reception beams and to the data streams of the corresponding emitters to generate transmission beams.

In another embodiment, the beamformer synthesizes directional reception channels and process transmission channels to synthesize telemetry data that is emitted by the emitters. The beamformer subsystem is configured to create a telemetry data reception beam that is focused in a specific direction by temporally aligning telemetry data received from the telemetry subsystem and then by summing individual time domain samples.

BRIEF DESCRIPTION OF THE DRAWINGS

The preferred embodiments described herein and illustrated by the drawings hereinafter are to illustrate and not to limit the invention, where like designations denote like elements.

DETAILED DESCRIPTION

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments. Parts that are the same or similar in the drawings have the same numbers and descriptions are usually not repeated.

U.S. Pat. No. 9,832,545 ("the '545 patent") and U.S. Pat. No. 10,652,634 ("the '634 patent") by Peter Houser et al. describe a distributed directional aperture (DDA) system that provides the capability to receive and/or transmit signals. The DDA system overcomes the disadvantages of the conventional aperture systems. For example, the DDA system may alleviate the stovepipe limitations of the conventional aperture systems. The applications of the DDA system of the '545 patent, however, are directed to fixed installations such as skin of aircraft, ship, and ground vehicles; the unique structural features of vertical lift aircraft such as helicopters are not specifically considered. The disclosed invention provides DDA system that are configured to be used for vertical lift aircraft. For general features of the DDA system, the entire contents of the '545 patent are incorporated herein by reference. The vertical lift aircraft in the disclosed invention includes helicopters in which lifting and propulsion forces are provided by rotating rotor wings or blades. The vertical lift aircraft may include tiltrotors that have fixed wings but also have rotor systems that are used for vertical take-off and landing and may be also used for propulsion.

Figure 1:
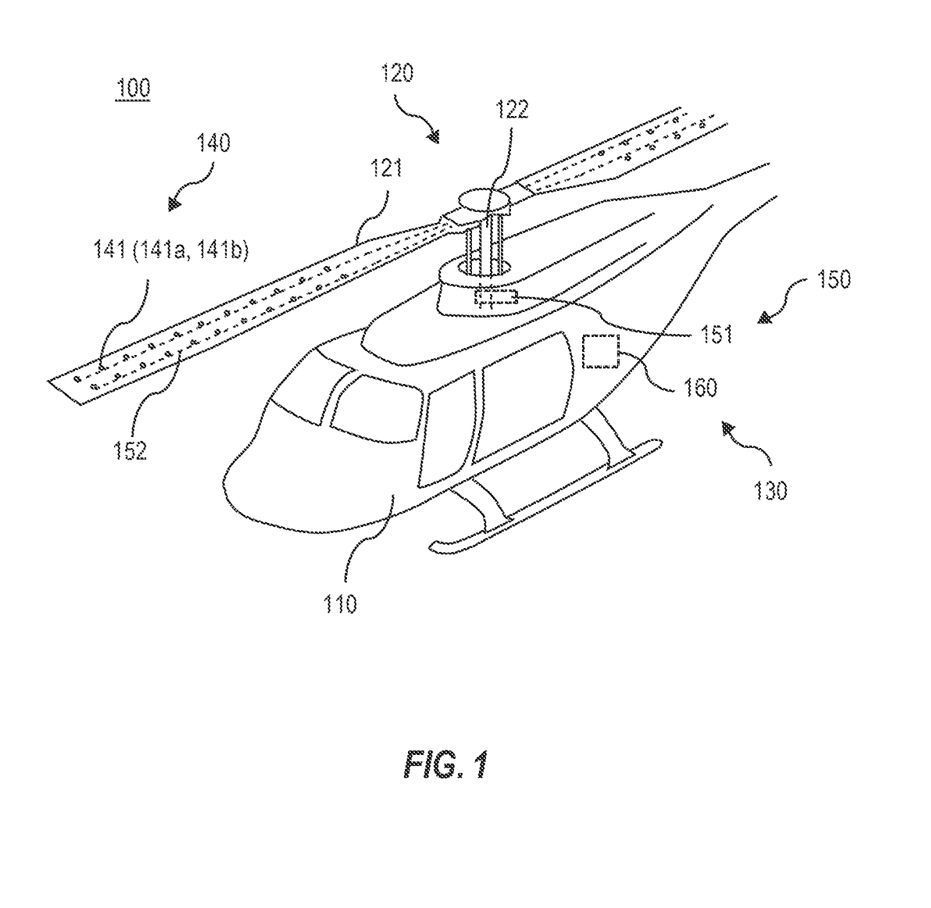
FIG. 1 is a diagram illustrating exemplary vertical lift aircraft in which distributed directional aperture (DDA) system is installed.

With reference to FIG. 1, shown is a diagram illustrating exemplary vertical lift aircraft 100 in which DDA system 130 is installed. The vertical lift aircraft 100 has fuselage 110 and rotor system 120 which includes rotary wings (or blades) 121 and vertical rotor shaft 122 which drives the rotary wings 121. The rotary wings 121 rotate about the rotor shaft 122 to provide lifting and propulsion forces. The rotor system 120 may be connected to one or more engines (not shown), and is rotatably coupled to the fuselage 110. The vertical lift aircraft 100 includes DDA system 130 that provides the vertical lift aircraft 100 with communications, signals intelligence (SIGNINT), positional sensing (e.g. radar), jamming, and offensive cyber. Components of the DDA system 130 are installed throughout the fuselage 110 and the rotor system 120 of the vertical lift aircraft 100.

Figure 4:
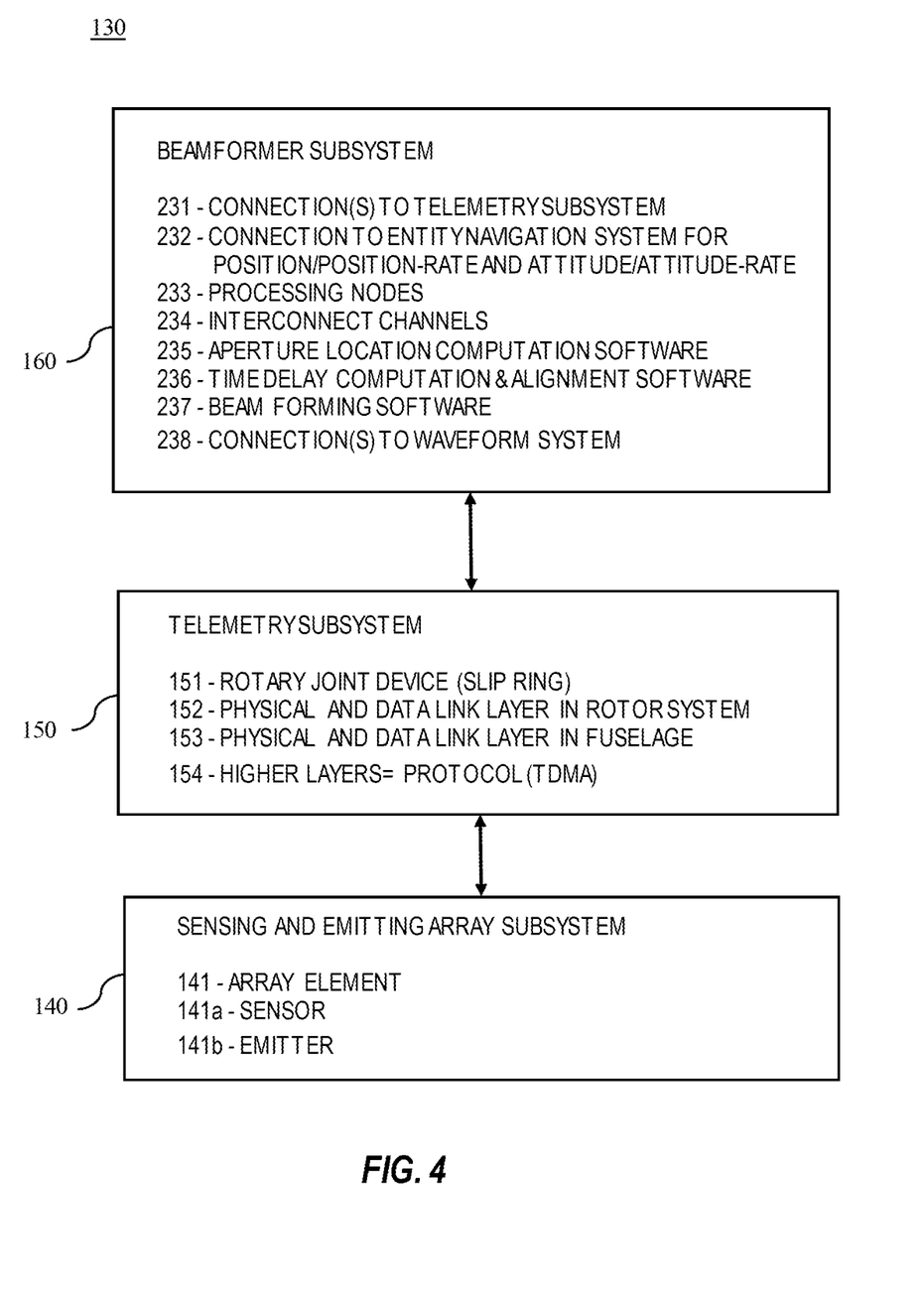
FIG. 4 is a diagram illustrating DDA system that is installed throughout the fuselage and the rotor system of vertical lift aircraft.

The DDA system 130 includes sensing and emitting array subsystem 140, telemetry subsystem 150, and beamformer subsystem 160 (see also FIG. 4). The sensing and emitting array subsystem 140 includes a plurality of array elements 141 that include a plurality of sensors 141a and emitters 141b. The sensors 141a sense energy in a media adjacent the rotary wings 121 and generate sensor signals. The sensor signals are transmitted to the beamformer subsystem 160 through the telemetry subsystem 150. The emitters 141b emit emitter signals, which are generated by the beamformer subsystem 160 and are conveyed by the telemetry subsystem 150, into the media. The array elements 141 are located in the rotary wings 121.

The beamformer subsystem 160 processes the sensor signals and emitter signals to synthesize directional reception channels and processes transmission channels to synthesize telemetry data that is to be emitted by the emitters. In an embodiment, the beamformer subsystem 160 is configured to determine relative positions of the plurality of sensors and emitters based on navigation data pertaining to the platform (vertical lift aircraft 100), to determine at least one time delay corresponding to each of the plurality of sensors and emitters based on the relative positions, and to apply the respective time delays to the corresponding sensor signals to generate reception beams and to the data streams of the corresponding emitters to generate transmission beams. In another embodiment, the beamformer subsystem 160 is configured to create a telemetry data reception beam that is focused in a specific direction by temporally aligning telemetry data received from the telemetry subsystem and then by summing individual time domain samples. The beamformer subsystem 160 may include computing hardware devices having one or more processors, and may be positioned in the fuselage 110 of the vertical lift aircraft 100.

The telemetry subsystem 150 conveys the sensor signals from the sensing and emitting array subsystem 140 to the beamformer subsystem 160, and conveys the emitter signals from the beamformer 160 to the sensing and emitting array subsystem 140. The telemetry subsystem 150 includes telemetry connections 152, 153 (see FIGS. 2A-2C) to transmit signals between the sensing and emitting array subsystem 140 and the beamformer subsystem 160. The telemetry connections 152, 153 may be wired connections (e.g. wires or optical fibers) or wireless connections (e.g. laser). The telemetry subsystem 150 further includes at least one joint device 151 that is configured to continuously transmit sensor and emitter signals between a stationary member (e.g., fuselage 110) and rotary member (e.g., rotor system 120). Herein, the joint device 151 may be slip rings, fiber optic rotary joint, or wireless joint devices (e.g. wireless slip rings) that is configured to transmit the sensor signals and the emitter signals wirelessly between the stationary member and rotary member. However, the joint device 151 is not limited to these devices. The joint device 151 of the disclosed invention includes any devices that are configured to transmit signals between a stationary member and rotary member. Sensor signals, which are received by the sensors 141a in the rotary wings 121 and are transmitted through telemetry connections 152 formed in the rotary wings 121, are transmitted to telemetry connections 153 formed in the fuselage 110 through the joint device 151. The joint device 151 may be electrical slip rings if the sensor and/or emitter signals are electrical signals and may be optical slip rings such as fiber optic rotary joints if the sensor and/or emitter signals are optical signals. If the sensor and emitter signals are optical signals, the telemetry subsystem 150 may further include channel multiplexor and de-multiplexor (not shown) if time division multiple access (TDMA) is used, and may include code-multiplexor and de-multiplexor (not shown) if code division multiple access (CDMA) is used.

As disclosed above, the embodiments of the disclosed invention overcome the disadvantages of the conventional aperture system for vertical lift aircraft by using DDA system and by installing the array elements 141 of the DDA system on rotor wings 121 of the vertical lift aircraft 100. The rotor wings are moving a few hundred miles per hour but that is very slow compared to the signal sampling rate. The DDA system does not require stovepiped telemetry and therefore enables installation of the array elements on the rotor wings which has unique structural features compared to the fixed wings of aircraft. Embedding the array elements 141 on the rotor wings 121 also enables to overcome the issues of intermittent blocking of signals by the rotor wings when the array elements are installed on fuselage of the vertical lift aircraft. The embodiments of the disclosed invention enhance the platform's aperture footprint and enable directional processing for all waveforms, and provide a very broad aperture that provides outstanding signal characteristics.

Figure 2A:
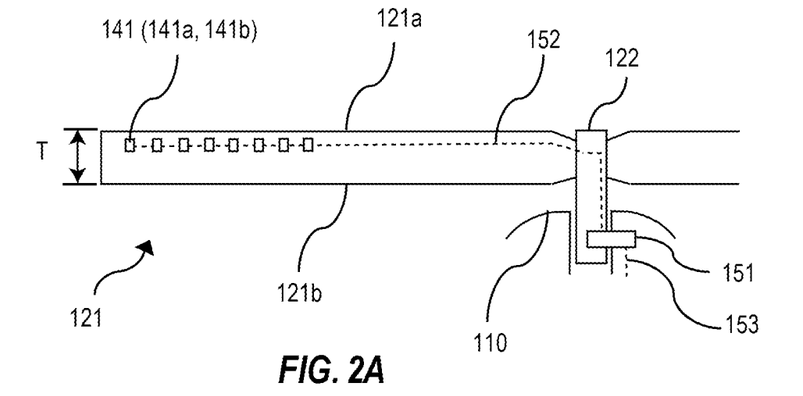
FIGS. 2A-2G are diagrams illustrating configurations of the sensing and emitting array subsystem in the rotor wings.
Figure 2B:
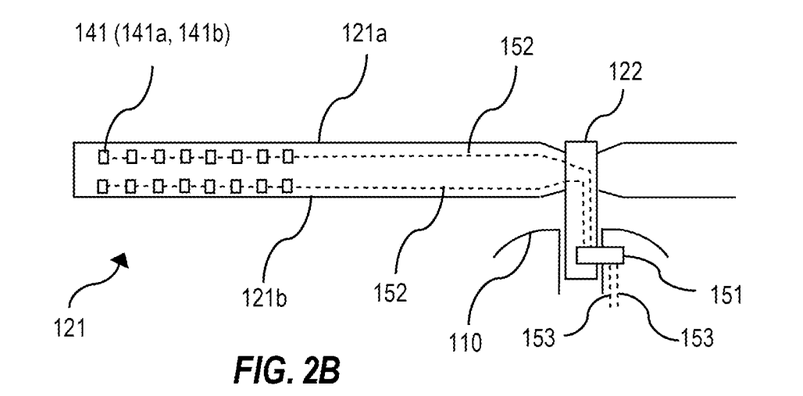
Figure 2C:
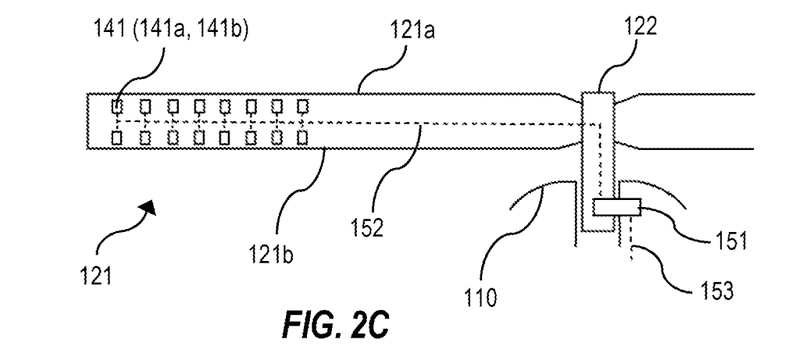

With reference to FIGS. 2A-2G, shown are diagrams illustrating configurations of the sensing and emitting array subsystem 140 in the rotor wings 121. Rotor wings 121 are generally built using composite that provides longer lifespan compared to metal wings. The composite rotor wings 121 may be built with a multiple layers to improve strength of the rotor wings. With composite rotor wings 121, the array elements 141 can be easily embedded within the rotor wings 121, preferably under the skin of the rotor wings 121, as shown in FIG. 2A-2C, to minimize the effects of the apertures on the platform's structural, aerodynamic, or radar observability characteristics. The array elements 141 and the telemetry connections 152 may be embedded within the interior of a composite material skin as part of the skin fabrication process. In another embodiment, the array elements 141 may be printed on an adhesive film with integral fibers that is affixed to the outer surface of the rotor wings 121.

Figure 2D:
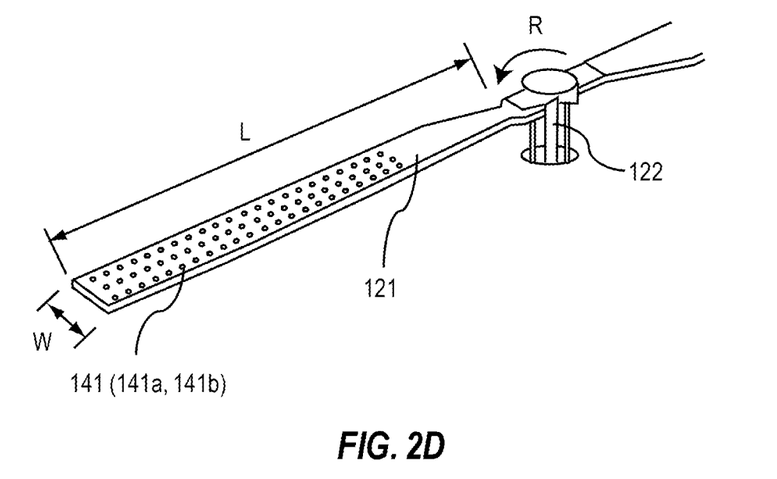
Figure 2E:
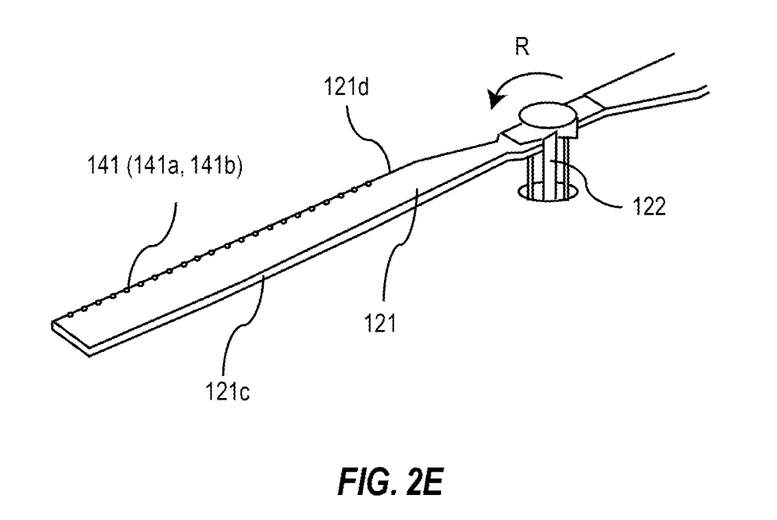

FIGS. 2A-2C exemplarily show cross-sectional view showing thickness T of the rotor wing 121. The array elements 141 may be embedded under the skin of the upper surface 121a of the rotor wing 121 as shown in FIG. 2A, or under skin of the lower surface 121b of the rotor wing 121. The array elements 141 may be embedded under skins of both the upper and lower surfaces of the rotor wings 121 as shown in FIG. 2B. Multiple array elements 141 may be linked across a common telemetry connection or trunk 152 as shown in FIG. 2C. The array elements 141 may be distributed over upper and/or lower surface areas 121a, 121b of the rotor wings 121 as shown in FIG. 2D. However, the array elements 141 may be distributed on the edges of the rotor wings 121 as shown in FIG. 2E. In one embodiment, the array elements 141 may be formed only on leading edges 121c or trailing edges 121d of the rotor wings, and in another embodiment, the array elements 141 may be formed on both the leading and trailing edges 121c, 121d of the rotor wings 121. FIG. 2E exemplarily shows the array elements 141 formed on the trailing edge 121d of the rotor wing 121. The leading and trailing edges 121c, 121d may be determined by the rotation direction R (clockwise or counter-clockwise) of the rotor wings 121. FIGS. 2D-2G exemplarily show the rotor wings 121 rotating in counter-clockwise direction R when viewed from the top.

Figure 2F:
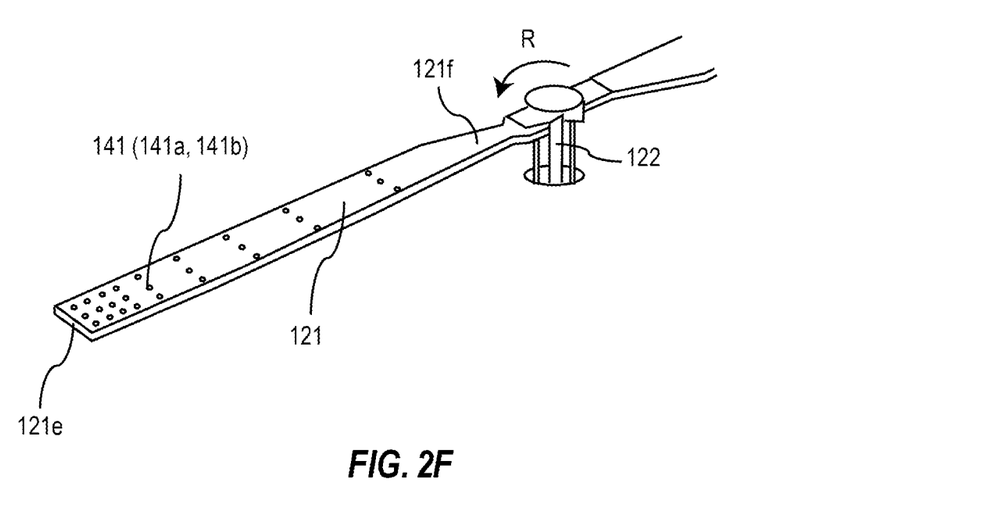
Figure 2G:
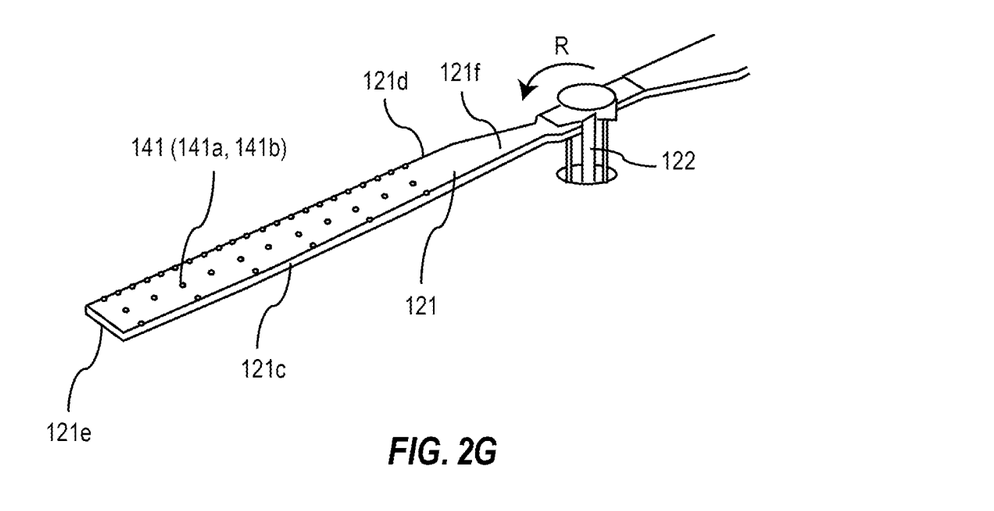

When the array elements 141 are distributed over upper and/or lower surface areas 121a, 121b of the rotor wings 121, the density of the array elements 141 (number of the array elements per unit area) may be constant (uniform density) over the surface area 121a or 121b. However, the density of the array elements 141 may not be constant but may change along the length L or width W of a rotor wing 121. For example, as shown in FIG. 2F, the density of the array elements 141 may be higher on the tip portion 121e of the rotor wing 121 than on the base portion 121f (opposite to the tip portion) of the rotor wing 121. Alternatively, the density of the array elements 141 may be higher on the base portion 121f of the rotor wing 121 than on the tip portion 121e of the rotor wing 121. For another example, as shown in FIG. 2G, the density of the array elements 141 may be higher on trailing edges 121d of the rotor wing 121 than on the leading edges 121c of the rotor wing 121. Alternatively, the density of the array elements 141 may be higher on leading edges 121c of the rotor wing 121 than on the trailing edges 121d of the rotor wing 121. These density profiles, however, can be combined. For example, the array elements 141 may have higher density on tailing tip portions of the rotor wing 121 compared to leading base portion of the rotor wing 121.

The density profiles described above are exemplary profiles, and may be combined and changed in various ways based on applications of DDA system and structures and shapes of the rotor wings. For example, the density of the array elements 141 may gradually decrease or increase from the tip portion 121e while proceeding toward the base portion 121f, and/or the density of the array elements 141 may gradually decrease or increase from the trailing edge 121d while proceeding toward the leading edge 121c. The array elements 141 may be distributed only on a certain portion of the surface or edge of the rotor wing 121, such as a tip portion, middle portion, or base portion of the rotor wing 121. When the vertical lift aircraft 100 has a plurality of rotor wings 121, rotor wings may have different configurations of the array element 141. For example, when the vertical lift aircraft has four (4) rotor blades, the array element 141 may be formed on two (2) rotor blades but may not be formed on another two (2) rotor blades.

Moreover, the array subsystem 140 may have a mixed array element configuration in which various types of array elements 141 are included in the array subsystem 140. For example, different array element designs (e.g. shape, size, and orientation) may be used to maximize performance within the targeted band (e.g. 1.2 GHz for Link 16 waveform). Another array element type may be used for maximum performance at another frequency (e.g. 400 MHz for UHF voice). When various types of array elements 141 are used, spacing between the array elements may be different based on the types of the array elements 141, as exemplarily shown in FIG. 2G.

Figure 3:
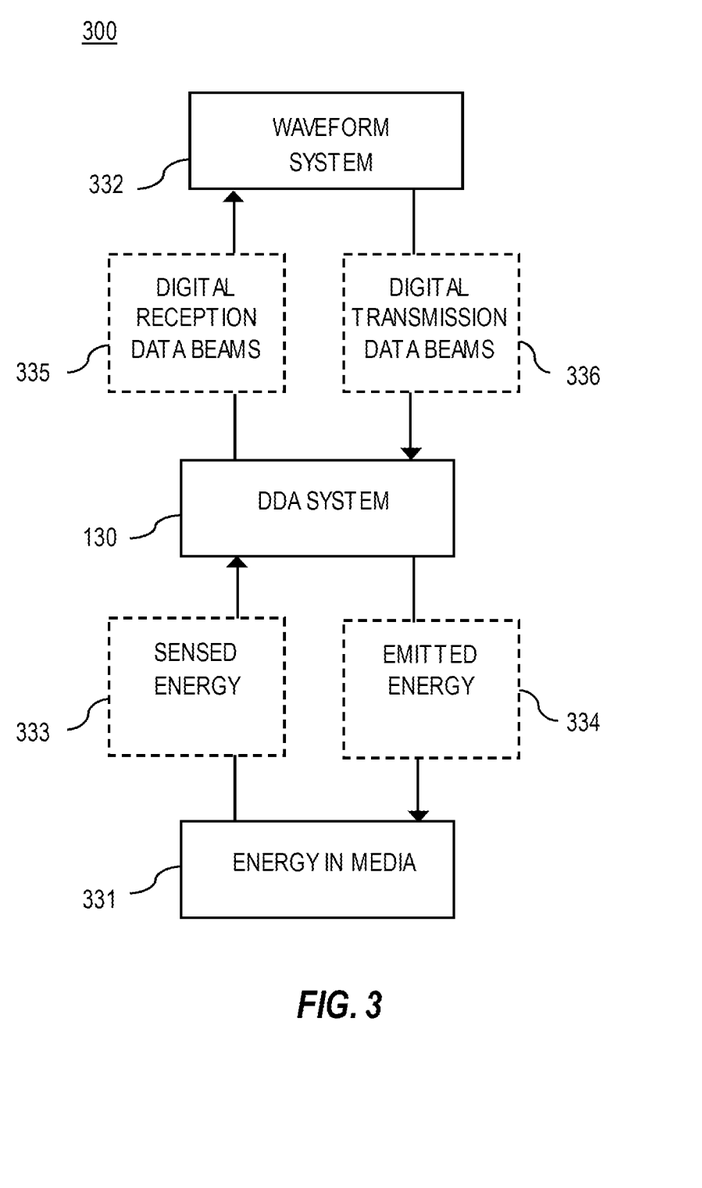
FIG. 3 is a flow diagram illustrating an exemplary flow of energy and information in an embodiment of a system 300 that includes the DDA system for sensing and/or emitting energy.

With reference to FIG. 3, shown is a flow diagram illustrating an exemplary flow of energy and information in an embodiment of a system 300 that includes a distributed directional aperture (DDA) system 130 for sensing and/or emitting energy. DDA system 130 exchanges energies 333, 334 using energy in media 331. As used here, the media 331 is the environment surrounding the entity or platform to which system 300 is coupled. In the disclosed invention, the media may be air. The system 300 detects energy in the media 331 (e.g., using sensors) and emits energy into media 331 (e.g., using emitters). The energy may be in the form of signals as described herein. DDA system 130 also transmits digital reception data beams 335 (e.g., at RF rates) to waveform system 332. The sensed energy signals 333 are processed by DDA system 130 in order to create digital reception data beams 335 that are ready for analysis by waveform system 332. Emitted energy 334 is generated by the DDA system 130 and is then emitted outward into media 331. DDA system 130 converts digital transmission data beams 336 that are generated by the waveform system 332 and transmitted to DDA system 130 and then emitted into the media 331.

A characteristic of an embodiment is that digital reception data beams 335 and digital transmission data beams 336 are digital and convey samples at a rate that fully captures the information of the corresponding sensed or emitted frequency signal (e.g., sensed energy signal 333 or emitted energy signal 334). This implies that the data rate is at least the highest emitted or radiated frequency of interest multiplied by the Nyquist criteria, e.g., a 1 GHz signal in the media 331 will correspond to a 2.5 GHz digital data rate through the data beams 335, 336.

Another characteristic of an embodiment that the digital reception data beams 335 and digital transmission data beams 336 may be connected to existing waveform systems without modification to those waveform systems. The existing waveform systems, such as an AN/ARC-210 radio, are designed for connection to existing omnidirectional antennas. Embodiments of DDS system 130 may be transparently connected to such systems, providing directional inputs to those systems, and thereby improving those systems' performance.

In an embodiment, waveform system 332 will encompass a very wide range of services, all using DDA system 130 to connect with (e.g., receive and/or sense) energy in the media 331. Waveform system 332 may encompass conventional services such as communications, jamming, intercept, and physical sensing (e.g., radar). Waveform system 332 may also encompass new services that are not possible with current apertures. For example, waveform system 332 may provide an automated aircraft positioning system that would be used in conjunction with a manned or unmanned aircraft. Emitters placed along the landing area could be resolved with very fine resolution by DDA system 130 in azimuth, elevation, and range, providing a far superior system for aircraft precision approach.

With reference to FIG. 4, shown is a diagram illustrating DDA system 130 that is installed throughout the fuselage 110 and the rotor system 120 of vertical lift aircraft 100 shown in FIG. 1. These DDA system 130 include sensing and emitting array subsystem 140, a telemetry subsystem 150, and a beamformer subsystem 160. Sensing and emitting array subsystem 140 provides connections between DDA system 130 and the energy in the media around the rotor wings 121 of the vertical lift aircraft 100. The sensing and emitting array subsystem 140 include a plurality of array elements 141. In an embodiment, individual elements of the array elements 141 may include sensor 141a dedicated to sending and emitter 141b dedicated to emitting. In another embodiment, individual elements of the array elements 141 may provide both sensing and emitting capabilities. Individual sensors 141a and emitters 141b may also be optimized for performance in specific frequencies, polarities, or other characteristics. The sensing and emitting array subsystem 140 may comprise a homogenous set of sensors 141a and emitters 141b or may comprise a heterogeneous set of sensors 141a and emitters 141b. At any given time, an optimized subset of sensors 141a and emitters 141b may then be selected based upon the mission and the characteristics of the intended receiving or transmitting signals.

Telemetry subsystem 150 provides a connection between the sensing and emitting array subsystem 140 and the beamformer subsystem 160. The telemetry subsystem 150 includes physical and data link layers 152, 153 between the array elements 141 and the beamformer subsystem 160. These physical connections 152, 153 convey information between the array elements 141 and the beamformer subsystem 160 using higher layers 154 that provide a telemetry protocol. The physical connections 152, 153 may be fiber optic, electrical, or wireless, and will support a data rate sufficient to convey the digitized energy samples. The telemetry protocol may be simple and point-to-point or may be bussed using a protocol such as Time Domain Multiple Access (TDMA). The telemetry subsystem 150 may provide connections only within a single local entity or may provide connections between sensors 141a and emitters 141b that are distributed across multiple entities such as multiple rotary wings that are physically dispersed.

In the DDA system 130 for vertical lift aircraft, the physical connection 152 may be formed in the rotor system 120 while the physical connection 153 may be formed on fuselage 110 of the vertical lift aircraft 100. Telemetry subsystem 150 of the disclosed invention may include one joint device 151 that is formed between the physical connections 152 and 153. The joint device 151 is configured to continually transmit signals between the physical connection 153 in the fuselage 110 and the physical connection 152 in the rotor system 120. When the physical and data link layers are fiber optic connections, the joint device 151 may be optical slip rings such as fiber optic rotary joints. The telemetry subsystem 150 may further include multiplexors and de-multiplexors (not shown) for the optical slip rings. If the physical and data link layers are electrical wires, the joint device 151 may be electrical slip rings. If the physical and data link are wireless connections, the joint device 151 may be wireless joint device.

Beamformer subsystem 160 hosts processing capabilities required to receive beams (digital data reception beams) and transmit beams (digital data transmission beams). Beamformer subsystem 160 includes connections to other systems, processing nodes, interconnect channels, and software.

A connection 231 to the telemetry subsystem (connecting the beamformer subsystem 160 to the telemetry subsystem 150) provides a physical connection and protocols that allow the beamformer subsystem 160 to communicate with the array elements 141 through the telemetry subsystem 150. A connection 232 to the entity's navigation system provides position, attitude, position rates, and attitude rates of the entity so that these quantities may be used by time delay computation and alignment software 236. A connection 238 to the waveform system provides a connection for exchanging reception (digital data reception beams) and transmission beam data (digital data transmission beams) with a waveform system.

Processing nodes 233 and interconnect channels 234 collectively provide a parallel data processing capability that is sufficient to implement beamforming analysis for information reception and transmission. This beamforming analysis is accomplished by aperture location computation software 235, the time delay computation and alignment software 236, and beamforming software 237. The beamforming may also use phase delay methods. In embodiments, DDA system 130 includes a plurality of processing nodes and interconnect channels. DDA system 130 aggregates the processing capacity of those nodes and channels to provide a cumulative capability. In another preferred embodiment, DDA system 130 includes only a single processing node having sufficient processing capacity to provide all required capabilities.

A reception beamforming process executed by the beamforming software 237 coherently sums signals received through the telemetry subsystem 150 from multiple sensors 141a in order to create a reception beam (digital data reception beam) that is focused in a specific direction by temporally aligning the data and then summing the individual time domain samples. This temporal alignment is based upon the position and attitude of the platform, computed using the externally supplied platform data.

A transmission beamformer process executed by the beamforming software 237 generates signals for transmission by multiple emitters 141b in such a way that the emission beam (digital data transmission beam) is focused in a specific direction by creating and temporally aligning the emitted data stream for each emitter 141b. The transmission beamformer process is based upon the position and attitude of the platform (entity), computed using the externally supplied platform data. Beamformer subsystem 160 routes the required emission signals to the appropriate emitters through telemetry subsystem 150.

Aperture location and computation software 235 computes the location of each sensor 141a and emitter 141b so that the reception and transmission temporal alignment values may be computed based upon the relative locations of the sensors 141a and emitters 141b.

The quality of beamformer outputs will be a function of the number of array elements 141 (the number of sensors 141a and emitters 141b) and the total span of the array elements 141 across the entity which is the rotor wing 121.

In general, a span of 5*λ (lambda) or 10*λ (lambda) may provide useful capability, where λ is the wavelength of the highest frequency of interest. In an embodiment, a span of at least 48*λ (lambda) may be preferably used. In general, an embodiment may provide spacing between each sensor (e.g., sensor 141a) and between each emitter (e.g., emitter 141b) of nominally 0.5*λ (lambda). However, the overall preferred embodiment may deviate from these general guidelines without compromising the overall design integrity.

Figure 5A:
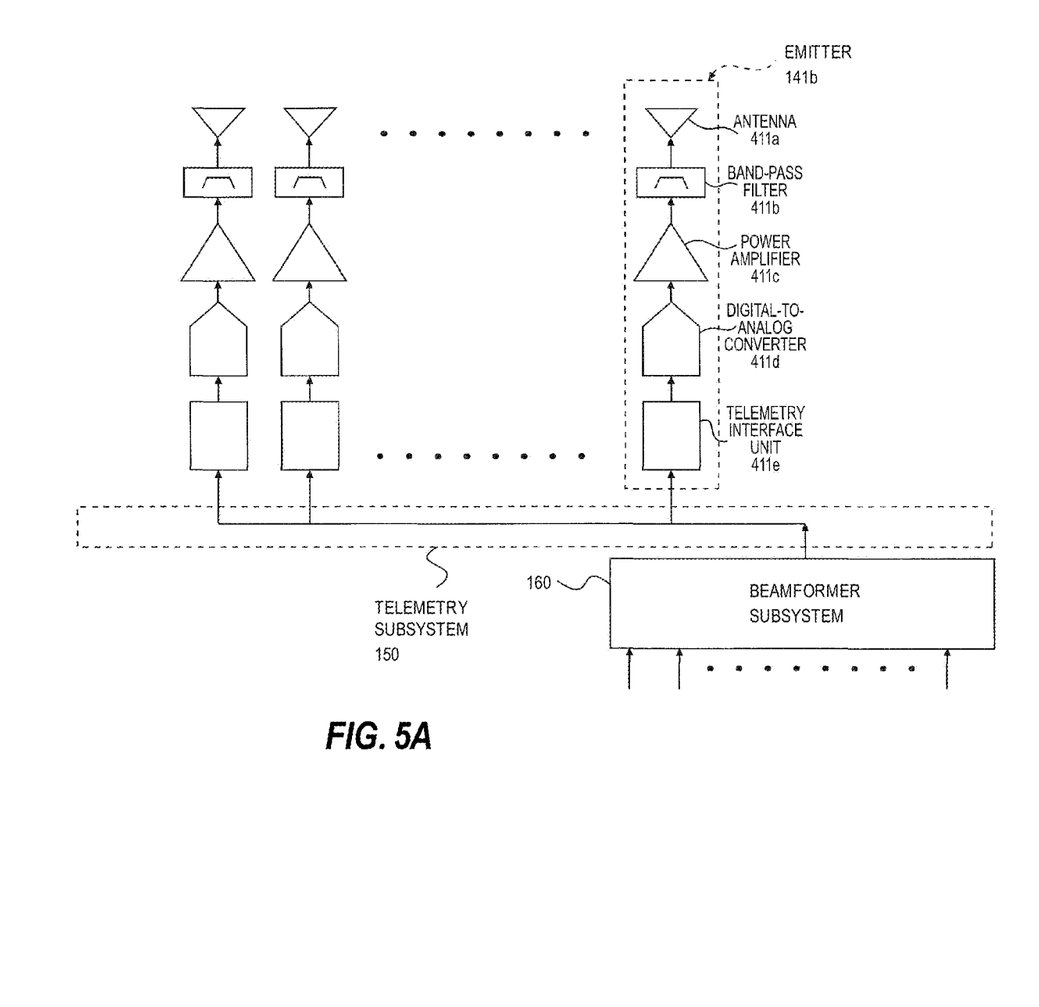
FIG. 5A is a schematic block diagram of an embodiment of emitter that is included in sensing and emitting array subsystem.

With reference to FIG. 5A, shown is a schematic block diagram of an embodiment of emitter 141b that is included in sensing and emitting array subsystem 140. A transmitting antenna (energy emitter) 411a within the emitter 141b emits energy based upon electrical signals that are initiated in beamformer subsystem 160 and are passed through telemetry subsystem 150 and telemetry interface 411e to digital-to-analog converter 411d. Antenna 411a may include a piece of small gauge wire that is tuned to the desired frequency. Alternatively, antenna 411a may be a complex circuit assembly. Alternatively, in the case of acoustic energy, antenna 411a may be a small speaker element. In any of those cases, antenna 411a receives signals from the digital-to-analog converter 411d and emits corresponding energy into a media.

In a preferred embodiment, the beamformer subsystem 160 computes transmit signals for each emitter and passes those signals through telemetry subsystem 150 to the telemetry interface unit 411e. The telemetry interface unit 411e passes the signals to the digital-to-analog converter 411d and the resulting analog signals are amplified by the power amplifier 411c. The resulting signals are band passed filtered, e.g., by band pass filter 411b, and then emitted by transmitting antenna 411a. In preferred embodiments, digital-to-analog unit 411d is capable of processing at a rate that is sufficient to generate power outputs at the highest signal of interest, e.g., for a 1 GHz frequency the sampling must be nominally 2.5 GHz.

Figure 5B:
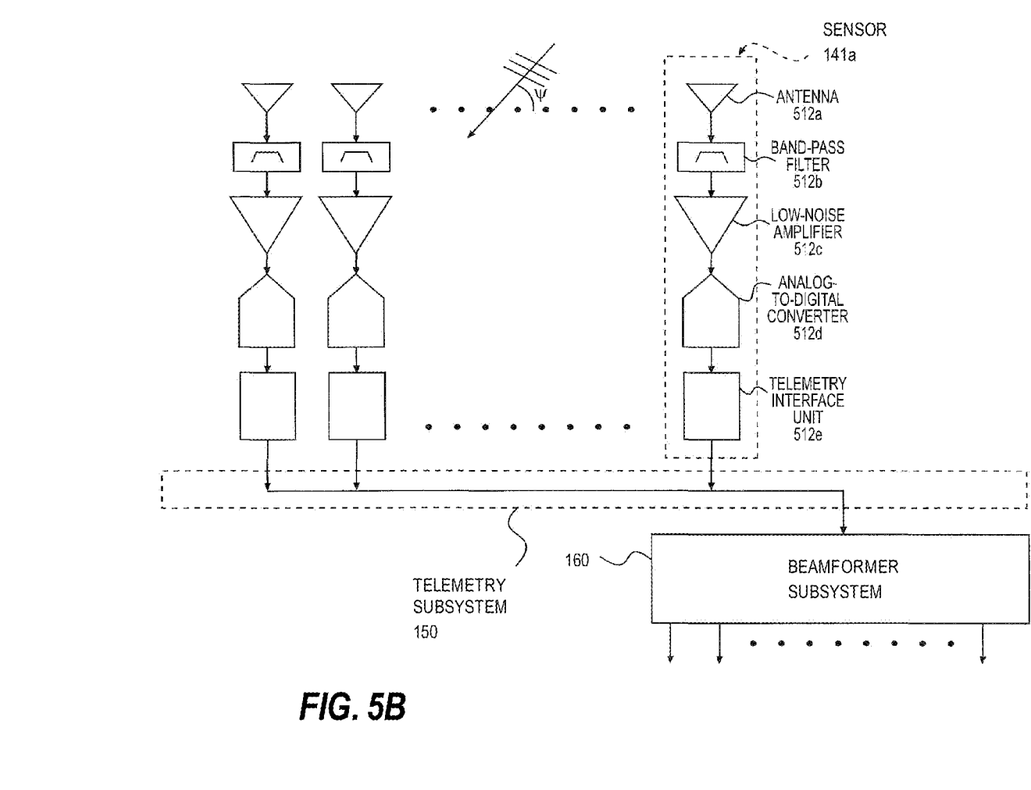
FIG. 5B is a schematic block diagram of an embodiment of sensor that is included in sensing and emitting array subsystem.

With reference to FIG. 5B, shown is a schematic block diagram of an embodiment of sensor 141a that is included in sensing and emitting array subsystem 140. Receiving antenna (energy collector) 512a within the sensor 141a absorbs energy from the media and converts it to electrical signals. For radio frequency energy, receiving antenna 512a may include a piece of small gauge wire that is tuned to the desired frequency. Alternatively, receiving antenna 512a may be a complex circuit assembly. Alternatively, in the case of acoustic energy, receiving antenna 512a may be a small hydrophone. In any of those cases, receiving antenna 512a absorbs energy in the media and converts it to electrical energy within the sensor 141a.

In a preferred embodiment, once power has been received by receiving antenna 512a the received analog signal is band-pass filtered by band-pass filter receiving antenna 512a to remove frequencies outside of the range of interest and amplified by amplifier 512c to match analog-to-digital converter 512d electrical characteristics. The analog to digital converter 512d samples the analog signal at a rate that is appropriate to the highest frequency of interest and then passes the sample data through telemetry interface unit 512e and telemetry subsystem 150 to the beamformer system 160. In a preferred embodiment, the analog-to-digital unit 512d is capable of processing at a rate that is sufficient to perform time domain beamforming at the highest signal of interest, e.g., for a 1 GHz frequency the sampling must be nominally 10 GHz to 20 GHz.

Sensors 141a and emitters 141b require electrical power for operation. The connections required to supply such power are not illustrated in FIGS. 5A-5B. In one preferred embodiment, the required power will be conveyed through a telemetry subsystem 150 that may be based upon fiber optics. Current technologies have demonstrated the capacity to transmit small amounts of power though fiber optics and this may be sufficient for the sensors 141a and emitters 141b. In another preferred embodiment, electrical power may be provided through a metallic wire to the sensors 141a and emitters 141b. In a third preferred embodiment, electrical power may be conveyed by a magnetic or electrical field that surrounds the sensors 141a and emitters 141b, and is converted to electrical power by the sensors 141a and emitters 141b. Fiber optic and wireless power connections are a preferred embodiment because of their low impact on the host entity and their resistance to interference by the environment.

Figure 6:
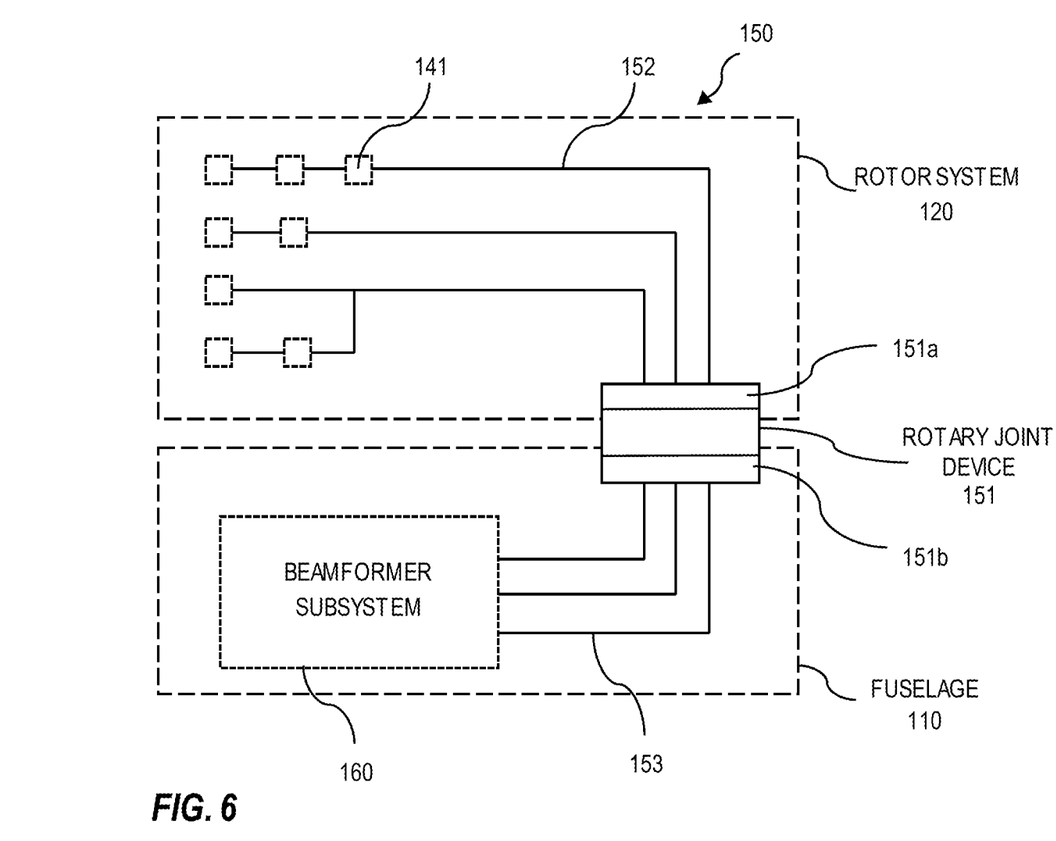
FIG. 6 is a block diagram of an embodiment of telemetry subsystem.

With reference to FIG. 6, shown is a block diagram of an embodiment of telemetry subsystem 150. FIG. 6 also shows beamformer subsystem 160 and array elements 141 of the sending and emitting array subsystem 140 to illustrate that telemetry subsystem 150 connects the array elements 141 of the sensing and emitting array subsystem 140 to the beamformer subsystem 160. In a preferred embodiment, telemetry subsystem 150 is bi-directional, conveying information for transmission from the beamformer subsystem 160 to the array elements 141 and received information from the array elements 141 to the beamformer subsystem 160. In another preferred embodiment, the telemetry system 150 is unidirectional, conveying only information for transmission or reception. The data from and to the array elements 141 may be multiplexed onto a single telemetry line using a protocol such as TDMA or CDMA.

In a preferred embodiment the telemetry subsystem 150 may be physically implemented as fiber carrying optical signals, as metallic wires carrying electrical signals, or as wireless signals. Fiber optic connections offer the highest data rate and are impervious to electrical interference. However, fiber cannot easily convey electrical power to the sensors and emitters. Metallic wire may be used for this or other reasons. Wireless connections impose the least impact on the entity but may be undesirable due to the potential for information security or RF interference.

In the vertical lift aircraft 100, the rotor system 120 is rotatably coupled to the fuselage 110. As the array elements 141 of sensing and emitting array subsystem 140 are located in the rotor system 120 while the beamformer subsystem 160 is located in the fuselage 110, the telemetry subsystem 150 includes joint device 151 for continuously transmitting signals between the sensing and emitting array subsystem 140 and the beamformer subsystem 160. The joint device 151 is located at a joint portions between the fuselage 110 and the rotor system 120. Signals transmitted through telemetry connections 152 in the rotor system 120 are transmitted to telemetry connections 153 in the fuselage 110 through the joint device 151. First side 151a of the joint device 151 is located in the rotor system 120 and is connected to the telemetry connections 152, and second side 151b of the joint device 151 is located in the fuselage 110 and is connected to the telemetry connections 153. Signals are continuously transmitted between the sides 151a and 151b.

When the telemetry connections 152, 153 are fiber optic connections, the joint device 151 may be optical slip rings such as fiber optic rotary joints. The telemetry subsystem 150 may further include multiplexors and de-multiplexors (not shown) for the optical slip rings. In an embodiment, sensor signals transmitted in separate telemetry connections 152 may be bused into a single beam at the first side 151a of the joint device 151 by using a multiplexor, the single beam is transmitted to the second side 151b, and the single beam received in the second side 151b of the joint device 151 may be de-multiplexed into a plurality of sensor signals to be transmitted through separate telemetry connections 153. In the similar way, emitter signals transmitted in separate telemetry connections 153 may be bused into a single beam at the second side 151b of the joint device 151 by using a multiplexor, the single beam is transmitted to the first side 151a, and the single beam received in the first side 151a of the joint device 151 may be de-multiplexed into a plurality of emitter signals to be transmitted through separate telemetry connections 152. In this case, the single beam may be de-multiplexed into the same number or a different number of signals than the multiplexed signals. In other words, the numbers of the telemetry connections 152, 153 may be the same or may be different. If electrical power is provided through metallic wires to the sensors 141a and emitters 141b, the joint device 151 may be configured to include electrical slip rings to continuously transmit the electrical power between the fuselage 110 and the rotor system 120.

Figure 7:
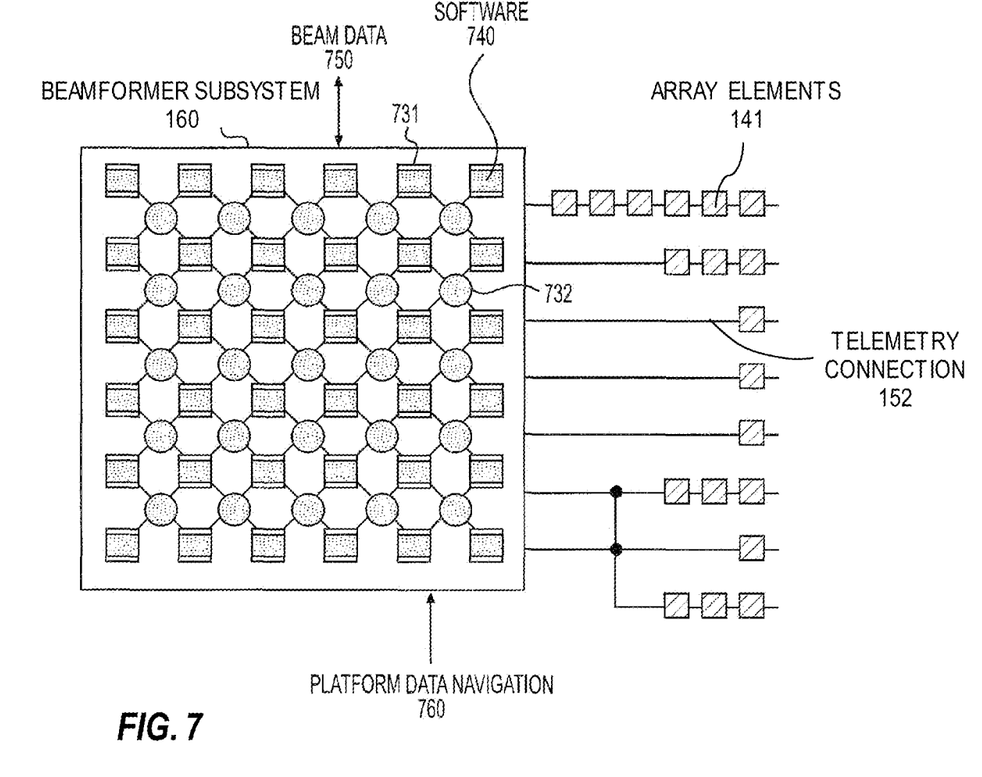
FIG. 7 is a block diagram of an embodiment of beamformer subsystem.

With reference to FIG. 7, shown is a block diagram of an embodiment of beamformer subsystem 160, illustrating processing nodes exchanging data through interconnect channels. Allocation of functionality (i.e., software 740 to the processing nodes) is also depicted. Beamformer subsystem 160 includes processor nodes 731 that execute processor software 740. The processor nodes 731 communicate via an interconnect mesh that is implemented using router nodes 732. In a preferred embodiment the processor nodes 731, routers 732, and interconnect mesh are implemented on a single electronic chip. Multiple chips are then interconnected to create a processor array of sufficient processing capacity.

In a preferred embodiment, congruence is established between processors 731 and the sensors and emitters. One or more processors 731 are loaded with the received data from a sensor through the telemetry subsystem 150 and use that data to perform the calculations required to create directional reception beams of data at the appropriate beamformer subsystem 160 output rates. In addition, one or more processors are assigned the task of creating ready-for-transmit data that will be transmitted to a specific emitter through the telemetry subsystem 150.

In a preferred embodiment the processor software, as distributed across the beamformer subsystem 160 array of processor nodes 731, provides the capability to compute received beams data 750 based upon the sensor data that is stored within the beamformer processors 731. Each such received beam comprises the sampled data from the omni-directional sensors that has been computationally transformed in a manner such that it corresponds to the sampled data that would have been received from a directional antenna that is pointed and stabilized in a specified direction.

In a preferred embodiment, the processor software 740, as distributed across the beamformer subsystem 160 array of processor nodes 731, also provides the capability to compute data that is ready for emission based upon transmit beam data 750 that is received from the waveform system. The transmit beam data is computationally transformed to compute the equivalent signals that must be emitted by the individual emitters in order to create energy in the media that corresponds in power and direction of the transmit beam data.

The receive and transmit beam data 750 is created by the beamforming software 740 that executes on the processors 731. Such capabilities are well understood by persons familiar with the art of digital signal processing. The beamforming software 740 has three principal functions. First, beamforming software 740 receives platform navigation data 760 and uses that data to compute the relative position of all sensors and emitters across the entity. Second, beamforming software 740 uses the sensor and emitter positions to compute the corresponding time delays that are needed for temporal alignment when creating receive or transmit beams. Third, beamforming software 740 applies the time delays to the received sensor data to create reception beams and to the transmission beam data to create data for the emitters.

Figure 8:
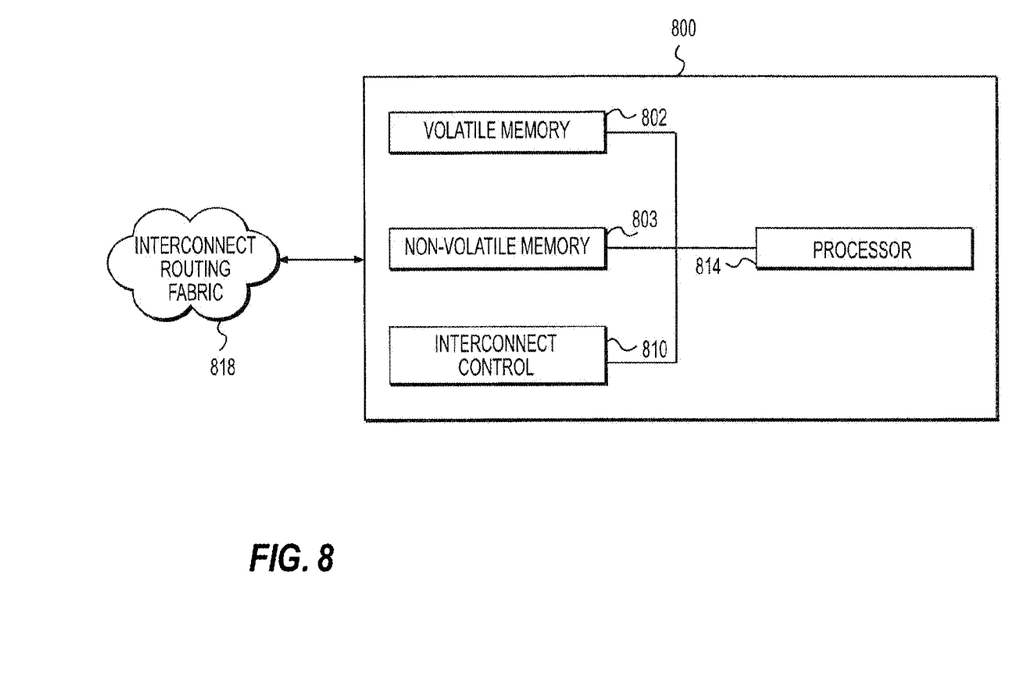
FIG. 8, shown is a block diagram illustrating exemplary hardware components of a processing node.

With reference to FIG. 8, shown is a block diagram illustrating exemplary hardware components of a processing node 800 (element 731 in FIG. 7) within the beamformer subsystem 160 that may be used in connection with the method for providing a DDA system for sensing or emitting energy. The processing node 800 includes a processor 814 that is capable of executing the beamforming software 740. The processing node 800 also includes non-volatile memory 803 for storing the software 740, volatile memory 802 for storing intermediate results during software 740 execution, and interconnect control 810 for maintaining connections with other processor nodes through the interconnect routing fabric 818. In a preferred embodiment, the memory 802, 803, processor 814, and interconnect control 810 are implemented as areas within a gate array processor and are replicated within the gate array to provide a plurality of processor nodes.

The DDA systems and methods described throughout this disclosure may implement additional exemplary hardware components. For example, the processing node 800, or other computer system similarly configured, may include and execute one or more subsystem components to perform functions described herein, including steps of methods described above. Likewise, a mobile device which includes some of the same components of processing node 800 may run an application and perform steps of methods described above. Processing node 800 may connect with a network, e.g., Internet, or other network, to receive inquires, obtain data, and transmit information.

Processing node 800 may also include a secondary storage device. Processing node 800 may also include a plurality of processors and be configured as a plurality of, e.g., bladed servers, or other known server configurations. Processing node 800 may also include an input device, a display device, and an output device. Volatile memory 802 may include RAM or similar types of memory, and may store one or more applications for execution by processor 814. Non-volatile memory 803 or secondary storage device may include a hard disk drive, floppy disk drive, CD-ROM drive, or other types of non-volatile data storage. Processor 814 executes the application(s), such as subsystem components, which are stored in Volatile memory 802, Non-volatile memory 803, or secondary storage, or received from the Internet or other network. The processing by processor 814 may be implemented in software, such as software modules, for execution by computers or other machines. These applications preferably include instructions executable to perform the system and subsystem component (or application) functions and methods described above and illustrated in the drawings herein. The applications preferably provide graphical user interfaces (GUIs) through which users may view and interact with subsystem components (or application in mobile device).

Processing node 800 may store one or more database structures in non-volatile memory 803 or secondary storage, for example, for storing and maintaining databases, and other information necessary to perform the above-described methods. Alternatively, such databases may be in storage devices separate from subsystem components.

Also, as noted, processor 814 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device may include any device for entering information into processing node 800, such as a touch-screen, keyboard, mouse, cursor-control device, touch-screen, microphone, digital camera, video recorder or camcorder. The input device may be used to enter information into GUIs during performance of the methods described above. The display device may include any type of device for presenting visual information such as, for example, a computer monitor or flat-screen display (or mobile device screen). The display device may display the GUIs and/or output from sub-system components (or application). Output device may include any type of device for presenting a hard copy of information, such as a printer, and other types of output devices include speakers or any device for providing information in audio form.

Examples of processing node 800 include dedicated server computers, such as bladed servers, personal computers, laptop computers, notebook computers, palm top computers, network computers, mobile devices, or any processor-controlled device capable of executing a web browser or other type of application for interacting with the system.

Although only one processing node 800 is shown in detail, the system may use multiple computer system or servers as necessary or desired to support the users and may also use back-up or redundant servers to prevent network downtime in the event of a failure of a particular server. In addition, although processing node 800 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CDROM; or other forms of RAM or ROM. The computer-readable media may include instructions for controlling a computer system, processing node 800, to perform a particular method, such as methods described above.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A distributed directional aperture (DDA) system installed in a vertical lift aircraft that comprises a fuselage and a rotor system including rotary wings rotatably coupled to the fuselage, the DDA system receiving and transmitting signals in one or more frequency bands, comprising:
    a sensor and emitter array subsystem that includes a plurality of array elements located in the rotary wings, wherein the array elements include sensors to sense energy in a media adjacent the rotary wings and to generate sensor signals and wherein the array elements include emitters to emit emitter signals based on processing of the sensor signals by the system;
    a beamformer subsystem that processes the sensor signals and emitter signals to synthesize directional reception channels and process transmission channels to synthesize telemetry data that is emitted by the emitters, wherein the beamformer subsystem is configured to:
        determine relative positions of the plurality of sensors and emitters based on navigation data pertaining to the vertical lift aircraft;
        determine at least one time delay corresponding to each of the plurality of sensors and emitters based on the relative positions; and
        apply the respective time delays to the corresponding sensor signals to generate reception beams and to the data streams of the corresponding emitters to generate transmission beams; and
    a telemetry subsystem that conveys the sensor signals from the sensor and emitter array subsystem to the beamformer subsystem and conveys the emitter signals from the beamformer subsystem to the sensor and emitter array subsystem, wherein the telemetry subsystem comprises at least one joint device that transmits the sensor signals and the emitter signals between the rotor system and the fuselage.

2. The system of claim 1 wherein the joint device includes optical slip rings that optically convey the sensor signals and the emitter signals between the rotor system and the fuselage.

3. The system of claim 1 wherein the telemetry subsystem comprises wireless telemetry connections.

4. The system of claim 1 wherein the joint device includes a wireless joint device that is configured to transmit the sensor signals and the emitter signals wirelessly.

5. The system of claim 1 wherein the joint device includes electrical slip rings that electrically convey signals or electric power between the rotor system and the fuselage.

6. The system of claim 1 wherein the rotor wings are made of composite materials and the array elements are located in an interior of the rotor wings.

7. The system of claim 1 wherein the array elements are distributed along edges of the rotary wings.

8. The system of claim 1 wherein multiple ones of the plurality of sensors and emitters are connected to the beamformer subsystem by a multiplexed telemetry line within the telemetry subsystem, and wherein multiplexing is performed using time division multiple access (TDMA) or code division multiple access (CDMA).

9. The system of claim 1 wherein an array of the sensors and emitters is arranged to facilitate directional processing in substantially all azimuths and elevations.

10. The system of claim 1 wherein the beamformer subsystem comprises an array of interconnected processor nodes with the capability of re-assigning processor node tasks in order to tune the beamforming process to specific mission needs.

11. The system of claim 1 wherein the sensor and emitter array subsystem comprises array elements having different configurations.

12. A distributed directional aperture (DDA) system installed in a vertical lift aircraft that comprises a fuselage and a rotor system including rotary wings rotatably coupled to the fuselage, the DDA system receiving and transmitting signals in one or more frequency bands, comprising:
- a sensor and emitter array subsystem that includes a plurality of array elements located in the rotary wings, wherein the array elements include sensors to sense energy in a media adjacent the rotary wings and to generate sensor signals and wherein the array elements include emitters to emit emitter signals based on processing of the sensor signals by the system;
- a beamformer subsystem that processes the sensor signals and emitter signals to synthesize directional reception channels and process transmission channels to synthesize telemetry data that is emitted by the emitters, wherein the beamformer subsystem is configured to create a telemetry data reception beam that is focused in a specific direction by temporally aligning telemetry data received from the telemetry subsystem and then by summing individual time domain samples; and
- a telemetry subsystem that conveys the sensor signals from the sensor and emitter array subsystem to the beamformer subsystem and conveys the emitter signals from the beamformer subsystem to the sensor and emitter array subsystem, wherein the telemetry subsystem comprises at least one joint device that transmits the sensor signals and the emitter signals between the rotor system and the fuselage.

13. The system of claim 12 wherein the joint device includes optical slip rings that optically convey the sensor signals and the emitter signals between the rotor system and the fuselage.

14. The system of claim 12 wherein the telemetry subsystem comprises wireless telemetry connections.

15. The system of claim 12 wherein the joint device includes a wireless joint device that is configured to transmit the sensor signals and the emitter signals wirelessly.

16. The system of claim 12 wherein the joint device includes electrical slip rings that electrically convey signals or electric power between the rotor system and the fuselage.

17. The system of claim 12 wherein the rotor wings are made of composite materials and the array elements are located in an interior of the rotor wings.

18. The system of claim 12 wherein the array elements are distributed along edges of the rotary wings.

19. The system of claim 12 wherein multiple ones of the plurality of sensors and emitters are connected to the beamformer subsystem by a multiplexed telemetry line within the telemetry subsystem, and wherein multiplexing is performed using time division multiple access (TDMA) or code division multiple access (CDMA).

20. The system of claim 12 wherein an array of the sensors and emitters is arranged to facilitate directional processing in substantially all azimuths and elevations.

21. The system of claim 12 wherein the beamformer subsystem comprises an array of interconnected processor nodes with the capability of re-assigning processor node tasks in order to tune the beamforming process to specific mission needs.

22. The system of claim 12 wherein the sensor and emitter array subsystem comprises array elements having different configurations.

* * * * *